United States Patent
Jacob et al.

(10) Patent No.: US 10,675,922 B2
(45) Date of Patent: Jun. 9, 2020

(54) PNEUMATIC VEHICLE TIRE HAVING A TACKY SEALING

(71) Applicant: Continental Reifen Deutschland GmbH, Hannover (DE)

(72) Inventors: Matthias Jacob, Leipzig (DE); Oliver Schuermann, Langenhagen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 237 days.

(21) Appl. No.: 15/860,339

(22) Filed: Jan. 2, 2018

(65) Prior Publication Data

US 2018/0117974 A1     May 3, 2018

Related U.S. Application Data

(63) Continuation of application No. PCT/EP2016/054260, filed on Mar. 1, 2016.

(30) Foreign Application Priority Data

Jul. 3, 2015   (DE) ................. 10 2015 212 488

(51) Int. Cl.
*B60C 5/00*   (2006.01)
*B60C 19/12*   (2006.01)
*B60C 19/00*   (2006.01)

(52) U.S. Cl.
CPC .......... *B60C 19/122* (2013.01); *B60C 19/002* (2013.01)

(58) Field of Classification Search
CPC ......... B60C 19/122; B60C 19/00; B60C 5/00; B60C 19/002; Y10T 428/249982; B29D 30/0685
See application file for complete search history.

(56) References Cited

U.S. PATENT DOCUMENTS

| | | | |
|---|---|---|---|
| 2003/0150544 A1 | 8/2003 | Naito et al. | |
| 2004/0074579 A1* | 4/2004 | Nakakita | B29C 73/20 |
| | | | 152/505 |
| 2010/0307655 A1* | 12/2010 | Tanno | B60C 19/002 |
| | | | 152/504 |

FOREIGN PATENT DOCUMENTS

| | | | |
|---|---|---|---|
| DE | 102007028932 A1 * | 12/2008 | B60C 19/002 |
| EP | 2006125 A1 | 12/2008 | |

OTHER PUBLICATIONS

International Search Report dated May 12, 2016 of international application PCT/EP2016/054260 on which this application is based.

* cited by examiner

*Primary Examiner* — Alison L Hindenlang
*Assistant Examiner* — Debjani Roy
(74) *Attorney, Agent, or Firm* — David L. Cate; Gregory Adams

(57) ABSTRACT

A pneumatic vehicle tire having a self-sealing sealant arranged in its interior, on the inner surface opposite from the tread, the sealant being highly viscous and the sealant having such a tackiness that it adheres to the inner surface. The inner surface on which the sealant is arranged has regions provided with an adhesion-reducing effect, these regions provided with an adhesion-reducing effect taking up between 40% and 60% of the inner surface on which the sealant is arranged.

14 Claims, 2 Drawing Sheets

Fig. 2
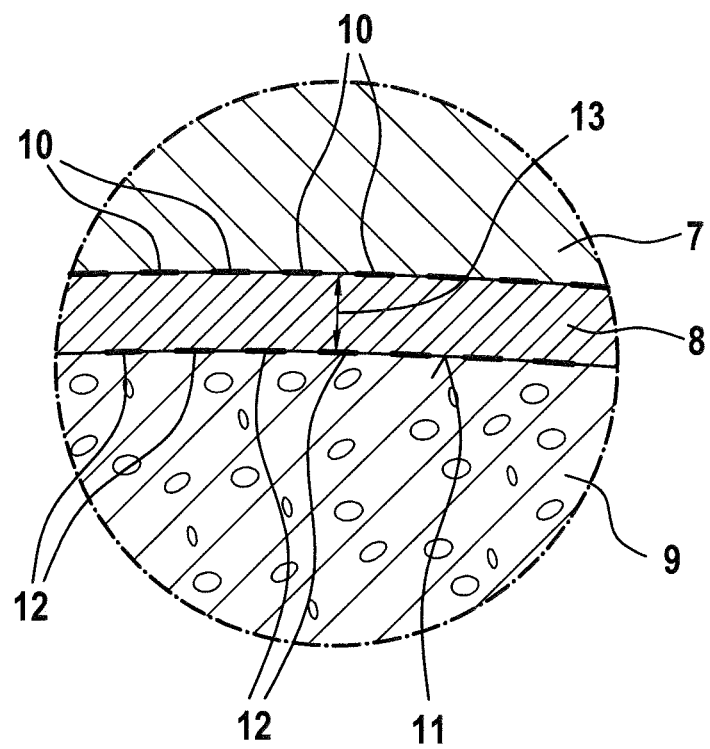
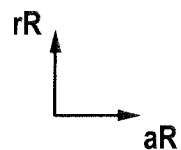

PNEUMATIC VEHICLE TIRE HAVING A TACKY SEALING

CROSS REFERENCE TO RELATED APPLICATIONS

This application is a continuation application of international patent application PCT/EP2016/054260, filed Mar. 1, 2016, designating the United States and claiming priority from German application 10 2015 212 488.6, filed Jul. 3, 2015, and the entire content of both applications is incorporated herein by reference.

FIELD OF THE INVENTION

The invention relates to a pneumatic vehicle tire including a self-sealing sealant arranged in its interior, on the inner surface opposite from the tread, the sealant being highly viscous and the sealant having such a tackiness that it adheres to the inner surface.

BACKGROUND OF THE INVENTION

Pneumatic vehicle tires with a self-sealing sealant are sufficiently well known to a person skilled in the art. The sealant is arranged in the interior of the tire, on the inner surface in projection of the tread. The sealant has such a viscosity and tackiness that, after being introduced into the finished tire, it adheres fixed-in-place to it. In the case of a puncture of the tread, with the item that causes the puncture expelled, the sealant flows into the channel left behind and seals it off in an airtight manner.

"Highly viscous" should be understood here as meaning a sealant of which the viscosity is more than 10 Pa·s.

It is problematic however that, for production-related reasons, the fully vulcanized tire has a so-called adhesion reducer on its inner surface. This adhesion reducer has been transferred to the inner surface of the tire during the vulcanization process from the inner bladder, which is provided with an adhesion reducer over its entire surface.

Since the sealant adheres poorly to the adhesion reducer, it is usual to remove the adhesion reducer completely from the inner surface of the tire by cleaning methods. This cleaning has the effect that the sealant adheres well to the inner surface of the tire. However, this good adherence has the simultaneous effect that the flowability of the sealant is reduced, which can have disadvantageous consequences for the sealing characteristics. In order to ensure reliable sealing, the sealing layer must be applied relatively thickly, to approximately 7 mm.

SUMMARY OF THE INVENTION

It is an object of the invention to provide a pneumatic vehicle tire having a sealant in its interior, on the inner surface opposite from the tread, that in the event of punctures of the tread reliably seals by itself.

The object can, for example, be achieved by the inner surface of the tire on which the sealant is arranged having regions provided with an adhesion-reducing effect, these regions provided with an adhesion-reducing effect taking up between 20% and 80% of the inner surface on which the sealant is arranged.

The inner surface on which the sealant is arranged has regions that are provided with an adhesion-reducing effect and regions that are not provided with an adhesion-reducing effect. The proportion taken up by these regions provided with an adhesion-reducing effect is between 20% and 80%. The regions not provided with an adhesion-reducing effect are responsible for the reliable adhesive force of the sealant on the inner surface. The regions provided with an adhesion-reducing effect bring about an improvement in the flowability of the sealant, and consequently the sealing when there are punctures.

It is advantageous if the regions provided with an adhesion-reducing effect are arranged evenly distributed over the circumference of the tire. As a result, the adhesive force and also the sealing are balanced over the circumference of the tire and are reliably obtained.

It is expedient if the regions provided with an adhesion-reducing effect have the structure of a network or grid or a strip structure or a geometrical 2-dimensional structure, such as including circles or polygons. This achieves the best balance between adherence and flowability of the sealant. Random, undesired detachments of the sealant are avoided.

It is expedient if the regions provided with an adhesion-reducing effect take up between 30% and 60%, preferably approximately 50%, of that inner surface on which the sealant is arranged.

In one embodiment of the invention, a sound absorber is arranged on the sealant in the radially inward direction. The sound absorber adheres to the sealant on account of the tackiness of the sealant. A sealant that is intended to be self-sealing is used at the same time as a "bonding agent" for fastening a sound absorber, preferably a sound-absorbing foam ring. It has been found that a sound absorber lying on the sealant can adversely affect the flowability of the sealant. The flow characteristics of the sealant are improved by the regions with reduced adhesion, in spite of the sound absorber lying on it.

In order to improve the flowability of the sealant further when there is a sound absorber adhesively attached on the sealant, the contact surface between the sound absorber and the sealant has regions that are provided with an adhesion-reducing effect, these regions provided with an adhesion-reducing effect taking up between 30% and 90% of the contact surface. Both the surface area between the inner surface and the sealant and the surface area between the sound absorber and the sealant has regions provided with an adhesion-reducing effect, whereby optimum flow characteristics of the sealant are obtained in the event of punctures. The regions provided with an adhesion-reducing effect can be of the same size or of different sizes with respect to the proportion of the surface area between the sound absorber and the sealant and the proportion of the surface area between the inner layer and the sealant.

It is expedient to arrange the regions provided with an adhesion-reducing effect of the contact surface between the sound absorber and the sealant and between the inner surface and the sealant offset in relation to one another, in order to obtain as little congruence as possible—in projection in the radial direction. A very good sealant flow is obtained as a result.

All sealants that are self-sealing and, at least immediately after application to the inner surface of the tire, are tacky enough that the foam ring can be pressed into place and in this way adhesively bonded with the sealant come into consideration within the scope of the invention. Therefore, sealants based on polyurethane or sealants that are a viscous mixture based on a butyl rubber, a polybutene or based on silicone are suitable, for example.

The improved flowability allows the layer thickness of the sealant to be greatly reduced, which is advantageous with respect to the production costs of the tire and also with respect to the weight of the tire. The reduction of the layer thickness of the sealant with respect to tires of the prior art is approximately 50%.

In the case of an arrangement of the sealant with a sound absorber, the layer thickness of the sealant is only 2.5 mm to 3.5 mm, preferably approximately 3 mm. In the case of tires without regions provided with an adhesion-reducing effect, the layer thickness is approximately 7.5 mm.

The sound absorber preferably has a volume of 0.5% to 50% with respect to the volume of the interior space of the tire that is formed by a rim.

BRIEF DESCRIPTION OF THE DRAWINGS

The invention will now be described with reference to the drawings wherein:

FIGS. 1 and 2 are together described below.

DESCRIPTION OF THE PREFERRED EMBODIMENTS OF THE INVENTION

Figure 1:
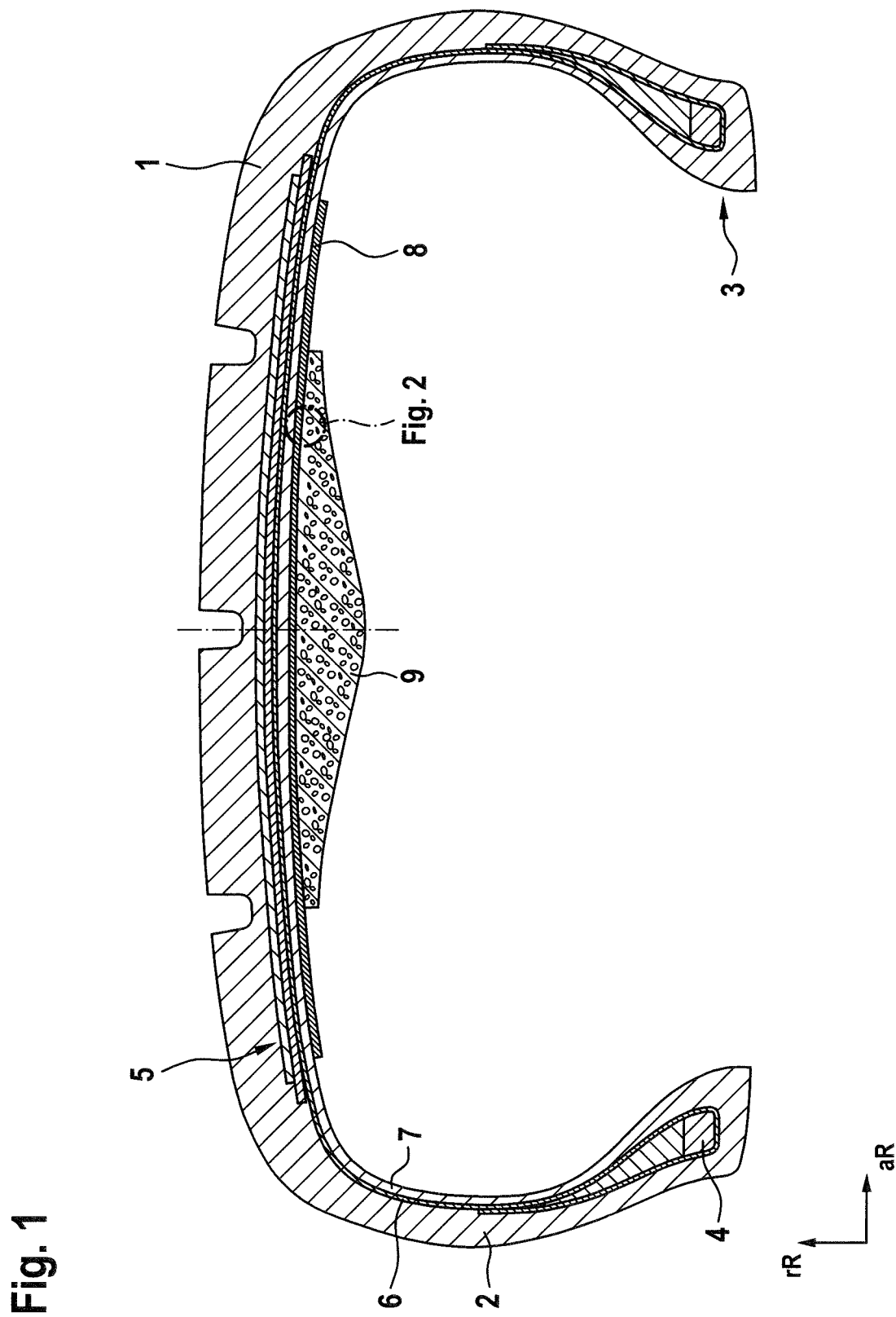
FIG. 1 shows a cross section through a pneumatic vehicle tire having a sealant layer and a sound absorber; and, FIG. 2 shows an enlarged detail from FIG. 1.

FIG. 1 depicts a cross section through a radial automobile tire that has a profiled tread 1, sidewalls 2, bead regions 3, bead cores 4 and also a multi-ply belt assembly 5 and a carcass insert 6. On its inner surface, the tire is covered with an inner layer 7 of an airtight rubber compound.

On the inner surface of the inner layer 7 opposite from the tread 1, a sealant 8 that is capable of acting in a self-sealing manner in the event of puncture damage to the tire is subsequently applied (to the finished tire). Adhesively attached to the sealant 8 is a sound-absorbing foam ring 9, which is pressed onto the sealant 8 immediately after application of the sealant 8, while the latter is still sufficiently tacky, as described below. With respect to its sound-absorbing properties, the sound-absorbing foam ring 9 is configured appropriately for the frequency of the tire cavity.

The foam ring 9 has for example the approximately elongated triangular cross section shown in FIG. 1 that is symmetrical with respect to the equator of the tire. The foam ring 9 is also configured in such a way that its volume takes up between 0.5% and 50% of the volume of the interior space of the tire, formed by the tire applied to a rim. Possible sealants are, for example, polyurethane gels or viscous mixtures based on butyl rubbers, polybutenes or silicone, it being possible for the mixtures to contain the customary further constituents, such as plasticizer oils. The sealant is introduced, for example by spraying, such that it covers at least the inner surface opposite from the tread 1. The tire can be rotated in order to optimally distribute the sealant on the inner surface. The sealant is introduced. At least immediately after application, the sealant should be relatively liquid and tacky. At this time, the prefabricated foam ring 9 is introduced into the interior of the tire and pressed into place. After fully reacting, the foam ring 9 adheres to the sealant 8, which is elastically deformable but remains fixed in place.

The inner surface, here the inner layer 7, on which the sealant layer 8 is arranged, has regions 10 provided with an adhesion-reducing effect. These regions 10 provided with an adhesion-reducing effect take up between 40% and 60% of the inner layer 7, on which the sealant is arranged. The adhesion reducer is transferred to the inner layer 7 from the inner bladder (not depicted) in the vulcanizing process. This adhesion reducer is partially removed from the inner layer 7 by mechanical methods or by use of a laser, whereby regions with good adhesion are obtained alongside regions provided with an adhesion-reducing effect between the inner layer 7 and the sealant 8. These regions 10 provided with an adhesion-reducing effect are arranged evenly distributed over the circumference of the tire and take up approximately 50% of that inner surface on which the sealant 8 is arranged, preferably in the structure of a network or grid. In addition, the contact surface 11 between the sound absorber 9 and the sealant 8 also has regions 12 provided with an adhesion-reducing effect. These regions 12 provided with an adhesion-reducing effect take up between 40% and 60% of the contact surface 11. In this case, the regions 12 provided with an adhesion-reducing effect and the regions 10 provided with an adhesion-reducing effect are arranged offset in relation to one another in order to have as little congruence as possible—in projection in the radial direction. The layer thickness 13 of the sealant 8 is 2.5 mm to 3.5 mm, preferably approximately 3 mm.

It is understood that the foregoing description is that of the preferred embodiments of the invention and that various changes and modifications may be made thereto without departing from the spirit and scope of the invention as defined in the appended claims.

LIST OF REFERENCE SIGNS

1 Tread
2 Sidewalls
3 Bead regions
4 Bead cores
5 Belt assembly
6 Carcass insert
7 Inner layer
8 Sealant layer
9 Sound-absorbing foam ring
10 Region provided with an adhesion-reducing effect
11 Contact surface
12 Region provided with an adhesion-reducing effect
13 Layer thickness of the sealant layer

What is claimed is:

1. A pneumatic vehicle tire comprising:
a tire body defining an interior and having a tread and an inner surface arranged opposite said tread;
a self-sealing sealant arranged in said interior, on said inner surface, wherein said sealant is a continuous layer directly on said inner surface;
said sealant being highly viscous and having a tackiness such that said sealant adheres to said inner surface;
said inner surface having regions provided with an adhesion-reducing effect which enables flowability of said sealant, and consequently sealing when there are punctures in the pneumatic tire; and,
said regions provided with said adhesion-reducing effect taking up between 20% and 80% of said inner surface on which the sealant is arranged.

2. The pneumatic vehicle tire of claim 1, wherein:
the pneumatic vehicle tire defines a tire circumference; and,
said regions provided with said adhesion-reducing effect are arranged evenly distributed over said tire circumference.

3. The pneumatic vehicle tire of claim 1, wherein said regions provided with said adhesion-reducing effect have the structure of a network or a grid or a strip structure or a geometrical 2-dimensional structure.

4. The pneumatic vehicle tire of claim 1, wherein said regions provided with said adhesion-reducing effect have a structure including circles or polygons.

5. The pneumatic vehicle tire of claim 1, wherein said regions provided with said adhesion-reducing effect take up between 30% and 60% of said inner surface on which said sealant is arranged.

6. The pneumatic vehicle tire of claim 1, wherein said regions provided with said adhesion-reducing effect take up 50% of said inner surface on which said sealant is arranged.

7. The pneumatic vehicle tire of claim 1 further comprising:
   a sound absorber arranged on said sealant in a radially inward direction; and,
   said sound absorber being adhered to said sealant on account of said tackiness of said sealant.

8. The pneumatic vehicle tire of claim 7, wherein:
   said sound absorber and said sealant conjointly define a contact surface;
   said regions are first regions;
   said contact surface between said sound absorber and said sealant has second regions provided with said adhesion-reducing effect; and,
   said second regions take up between 30% and 90% of said contact surface.

9. The pneumatic vehicle tire of claim 1, wherein said sealant is a polyurethane gel.

10. The pneumatic vehicle tire of claim 1, wherein said sealant is a viscous mixture based on a butyl rubber, a polybutene or based on silicone.

11. The pneumatic vehicle tire of claim 1, wherein in the case of an arrangement of a sound absorber on the sealant in which the sealant primarily has the function of an adhesive, the layer thickness of the sealant is 0.5 mm to 2 mm.

12. The pneumatic vehicle tire of claim 1, wherein, in the case of an arrangement of a sound absorber on the sealant in which the sealant primarily has the function of an adhesive, a layer thickness of the sealant is approximately 1 mm.

13. The pneumatic vehicle tire of claim 1, wherein, in the case of an arrangement of said sealant with a sound absorber, a layer thickness of the sealant is 2.5 mm to 3.5 mm.

14. The pneumatic vehicle tire of claim 1, wherein, in the case of an arrangement of said sealant with a sound absorber, a layer thickness of the sealant is approximately 3 mm.

* * * * *